US011268842B2

(12) United States Patent
Ilgner

(10) Patent No.: US 11,268,842 B2
(45) Date of Patent: Mar. 8, 2022

(54) ELECTRONICALLY DERIVING A CONCLUSION OF THE CONDITION OF SLURRY FLOW IN A NON-VERTICAL CONDUIT

(71) Applicant: CSIR, Pretoria (ZA)

(72) Inventor: Hartmut Johannes Ilgner, Pretoria (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 16/877,208

(22) Filed: May 18, 2020

(65) Prior Publication Data

US 2020/0278229 A1 Sep. 3, 2020

Related U.S. Application Data

(63) Continuation-in-part of application No. 15/512,380, filed as application No. PCT/ZA2015/050010 on Sep. 18, 2015, now Pat. No. 10,655,995.

(30) Foreign Application Priority Data

Sep. 18, 2014 (ZA) ................................ 2014/06834

(51) Int. Cl.

| | |
|---|---|
| ***G01F 1/74*** | (2006.01) |
| ***G01F 1/708*** | (2006.01) |
| ***G01F 1/684*** | (2006.01) |
| ***G01F 1/7084*** | (2022.01) |

(52) U.S. Cl.

CPC .............. *G01F 1/74* (2013.01); *G01F 1/6847* (2013.01); *G01F 1/7084* (2013.01)

(58) Field of Classification Search

CPC ........ G01F 1/74; G01F 1/7084; G01F 1/6847; G01F 1/6845; G01F 1/69; G01F 1/684; G01F 5/00; G01F 1/688; G01F 1/6888; G01F 1/68; G01F 25/0007; G01F 15/18

See application file for complete search history.

(56) References Cited

U.S. PATENT DOCUMENTS

| | | | | |
|---|---|---|---|---|
| 4,843,881 | A | 7/1989 | Hubbard | |
| 8,820,175 | B1 * | 9/2014 | Ahmed | G01F 1/74 73/861.04 |
| 10,655,995 | B2 | 5/2020 | Ilgner | |
| 2008/0092644 | A1 | 4/2008 | Hasebe | |
| 2008/0163692 | A1 * | 7/2008 | Huang | G01F 1/663 73/627 |
| 2011/0155255 | A1 | 6/2011 | Ladron de Guevara et al. | |

FOREIGN PATENT DOCUMENTS

| | | | | |
|---|---|---|---|---|
| EP | 1139073 | A1 | 10/2001 | |
| EP | 1477779 | A1 | 11/2004 | |
| WO | 2012/035483 | A2 | 3/2012 | |
| WO | WO-2013113356 | A1 * | 8/2013 | G01K 13/02 |

OTHER PUBLICATIONS

International Search Report and the Written Opinion for Application No. PCT/ZA2015/050010, dated Apr. 3, 2016, 11 pages.

* cited by examiner

*Primary Examiner* — David L Singer
*Assistant Examiner* — Anthony W Megna Fuentes
(74) *Attorney, Agent, or Firm* — McCarter & English, LLP; David R. Burns

(57) ABSTRACT

A method of electronically deriving a conclusion of a condition of slurry flow in a non-vertical conduit having a conduit wall and which contains a slurry to flow or flowing along the conduit is provided.

4 Claims, 4 Drawing Sheets

ELECTRONICALLY DERIVING A CONCLUSION OF THE CONDITION OF SLURRY FLOW IN A NON-VERTICAL CONDUIT

CROSS-REFERENCE TO RELATED APPLICATION

This application is a continuation-in-part of U.S. patent application Ser. No. 15/512,380, filed on Mar. 17, 2017, which claims priority to International Application No. PCT/ZA2015/050010, filed on Sep. 18, 2015, and South African Patent Application No. 2014/06834, filed on Sep. 18, 2014. The entire contents of each of the foregoing applications are incorporated herein by reference.

FIELD OF THE INVENTION

THIS INVENTION provides for electronically deriving a conclusion of the condition of slurry flow in a conduit. The invention provides a method of electronically deriving a conclusion of the condition of slurry flow in a non-vertical conduit. The invention also provides a system for electronically deriving a conclusion of the condition of slurry flow in a non-vertical conduit.

BACKGROUND TO THE INVENTION

IN THIS SPECIFICATION the term "slurry" refers broadly to mixtures of solids and liquids. This includes aqueous mixtures, in thickened or un-thickened form. Such mixtures may, for example, be in the form of tailings, concentrates, pastes, sludges (which may include biologically active solid ingredients), industrial wastes, or oil sands. "Slurry" particularly includes slurries that are regarded as "settling slurries". A "settling slurry" is a slurry that has a tendency to deposit, through gravity, a sediment or settled particle bed when flowing at a velocity slower than a "critical deposition velocity" of the slurry.

It is well established that a slurry is pumped most economically at a velocity just above its critical deposition velocity. The critical deposition velocity varies from case to case and is dependent on a number of different factors. Such factors include solids concentration or density of the slurry, composition of the slurry, particle size distribution in the slurry, and so on. In the mining and mineral extraction industry, as an example, thickened slurries or tailings are pumped through pipelines from mineral extraction plants to tailings dams. At velocities below the critical deposition velocity, solid particles in the slurry tend to settle in the pipeline, forming a sliding or stationary settled particle bed at the invert of the pipeline. This has a negative effect on pumping velocity at constant pumping power, and continuing build-up of sediment could eventually lead to pipeline blockage. If the slurry contains larger particles, such particles will tend to settle out first. This may lead to undesired, unstable operating conditions.

It seems obvious that to avoid negative consequences associated with pumping below the critical deposition velocity, pumping should be effected well in excess of it. However, this will increase operating costs, since more power will be consumed and since there will be greater frictional losses and pipeline wear. Another seemingly obvious measure is to reduce the particle concentration or density of the slurry by increasing the water content in order to decrease the critical deposition velocity. However, this may be an undesirable wastage of water and/or require an additional pumping operation to pump excess water back from the disposal site.

Even if, as is conventionally the case, slurry pumping systems are designed to operate above the critical deposition velocity determined for a particular slurry, it must be appreciated that the actual properties of the slurry may vary considerably from time to time. This is particularly so with respect to the ultrafine content in the particle size distribution of the slurry, the maximum particle size and the mineral composition. Selecting a single operating power with a safety margin worked in is therefore non-ideal over this variability. It would be more beneficial proverbially to sail closer to the wind, to detect the onset of particle settlement by means of instrumentation, and then to control the flow velocity continuously and maintain it at the lowest value possible while the concentration of the slurry is maintained at an appropriately high value. The present invention seeks to allow for achieving such control.

SUMMARY OF THE INVENTION

THE ANGULAR SPACINGS that are referred to in this specification are about an axis extending along a cross-sectional centre of a normal level of flow in the conduit that is provided. It will be appreciated that when the normal level of flow in the conduit is at a level at which the conduit is cross-sectionally filled with slurry, this centre will be a geometric cross sectional centre of the conduit.

Furthermore, the expression "condition of slurry flow" used in this specification is regarded as including a condition in which slurry flows along the conduit, but a settled particle bed has formed inside the conduit at the invert of the conduit. Therefore, the formation of a settled particle bed inside the conduit at the invert of the conduit is regarded as being part of the concept of "condition of slurry flow". The concept is also regarded as including a condition in which the conduit contains slurry, but in which there is virtually no flow of the slurry in the conduit.

In some embodiments there is provided a method of deriving a conclusion of the condition of slurry flow in a non-vertical conduit having a conduit wall, the method including

- generating, at a first heating point along the conduit wall which is at the invert of the conduit, a first locally heated spot on an interior surface of the conduit wall by means of heat delivered to the conduit wall at a heating power level that is maintained substantially over time;
- generating, at a second heating point along the conduit wall that is angularly spaced from the first heating point at an angular spacing of at least 90°, a second locally heated spot on the interior surface of the conduit wall by means of heat delivered to the conduit wall at a heating power level that is also maintained substantially constant over time;
- locally measuring the temperatures of the first and second heated spots respectively, thereby obtaining first and second temperature values T1 and T2;
- optionally measuring, at a reference point, a reference temperature and thereby obtaining a reference temperature value T3; and
- deriving a conclusion of slurry flow conditions prevailing in the conduit from at least one temperature difference selected from a first temperature difference, which is T1 minus T2, and a second temperature difference, which is T2 minus T3.

In some embodiments, the optional step is carried out.

In some embodiments, there is provided a system for deriving a conclusion of the condition of slurry flow in a non-vertical conduit having a conduit wall, the system including at least one heat source mounted to deliver heat to the conduit wall at a first heating point along the wall which is at the invert of the conduit, thereby to generate, in use, a first locally heated spot on an interior surface of the conduit wall by means of heat delivered to the conduit wall; and a second heating point along the wall which is angularly spaced from the first heating point at an angular spacing of at least 90°, thereby to generate, in use, a second locally heated spot on an interior surface of the conduit wall by means of heat delivered to the conduit wall, the system further including first and second temperature sensors that are arranged to measure, in use, the temperatures of the first and second heated spots respectively, thereby to obtain first and second temperature values T1 and T2;

optionally, a reference temperature sensor that is arranged at a reference point to measure, in use, a reference temperature and obtain a reference temperature value T3; and a computing device in communication with the first and second temperature sensors, and with the reference temperature sensor when provided, the computing device being programmed to derive an indication of slurry flow conditions prevailing in the conduit from at least one temperature difference selected from a first temperature difference, which is T1 minus T2, and a second temperature difference, which is T2 minus T3, which temperature differences the computing device is programmed to calculate.

In some embodiments, the reference temperature sensor is provided.

In some embodiments, there is provided a method of electronically deriving a conclusion of the condition of slurry flow in a non-vertical conduit having a conduit wall and which contains a slurry to flow or flowing along the conduit, the method including artificially generating at a first heating point along the conduit wall, which is defined at the invert of the conduit, a first locally heated spot on an interior surface of the conduit wall by means of heat delivered to the conduit wall by a heating device at a first heating power level that is maintained substantially constant over time;

artificially generating at a second heating point along the conduit wall, which is defined angularly spaced from the first heating point at an angular spacing of at least 90°, a second locally heated spot on the interior surface of the conduit wall by means of heat delivered to the conduit wall by a heating device at a second heating power level that is also substantially constant over time;

locally measuring the temperatures of the first and second locally heated spots respectively, thereby obtaining first and second temperature values (respectively T1 and T2);

communicating electronically generated signals carrying the values T1 and T2 to an electronic computing device, which operatively receives the signals and electronically automatically calculates a first temperature difference T1 minus T2; and automatically derives a conclusion of the condition of slurry flow prevailing in the conduit based at least on the relationship between the value of the first temperature difference and a first reference parameter, which is a reference parameter for the first temperature difference.

By "operatively receives" is meant that the computing device receives the signals carrying the values of T1 and T2, and interprets or decodes the signals in whichever manner necessary in order to calculate the first temperature difference. With respect to the signals it will be appreciated that embodiments can exist in which a single combined signal is communicated, rather than respective signals.

In some embodiments, heating supplied by all heating devices creates heated spots that would be, at least when there is no slurry flow in the pipe, at temperatures above the temperature of the slurry.

The method may also include measuring, at a predetermined reference point spaced from the first and second heating points, a third, reference temperature and thereby obtaining a third, reference temperature value (T3); and communicating an electronically generated signal carrying the value T3 to the electronic computing device, which operatively receives the signal and automatically calculates a second temperature difference T2 minus T3, wherein automatically deriving a conclusion, by means of the computing device, of the condition of slurry flow prevailing in the conduit is based also on the relationship between the value of the second temperature difference or of T2 and a second reference parameter, which is a reference parameter for the second temperature difference or for T2.

The reference point would typically be selected for minimal or no interference of the heated spots with the reference temperature. Accordingly, the reference point is preferably a point which is spaced as far away from the first and second heating points as possible, observing any desired restrictions on its location. The reference point need not be on the conduit, but preferably it is on the conduit as is stated below in greater detail.

The second reference parameter may be a predetermined threshold value for the second temperature difference. For example, the second reference parameter may be predetermined at 8° C., thus requiring the second temperature difference to be, at most, 8° C.

The method may then include automatically comparing, by means of the computing device, the second temperature difference to the second reference parameter; and automatically concluding, by means of the computing device, that the condition of slurry flow in the conduit is that there is no flow in the conduit, on the basis that the second temperature difference exceeds the second reference parameter.

Alternatively, the second reference parameter may be a threshold value for T2 and may be calculated as a predetermined value above the measured value for T3. For example, the predetermined value above the measured value of T3 may be 8° C. Therefore, the second reference parameter may be T3 plus 8° C.

The method may then include automatically comparing, by means of the computing device, T2 to the second reference parameter; and automatically concluding that the condition of slurry flow in the conduit is that there is no flow in the conduit, on the basis that T2 exceeds the second reference parameter.

Alternatively, the second reference parameter may be a predetermined undesired change in the second temperature difference over a predetermined time period. The method may then include automatically noting, by means of the computing device, changes in the second temperature difference; and automatically concluding that the condition of slurry flow in the conduit is that there is no flow in the conduit, on the basis that a change in the second temperature difference over the predetermined time period is equal to, or exceeds the predetermined undesired change over the predetermined time period.

The predetermined undesired change in the second temperature difference may, for example, be 0.25° C., while the predetermined time period may, for example, be 10 seconds. The conclusion derived on the basis of the second temperature difference that there is no flow in the conduit, may override any conclusion derived on the basis of the first temperature difference. "Override" in this specification means that a particular conclusion, whether it is the conclusion drawn on the basis of the first temperature difference, the second temperature difference, or any of the other temperature differences referred to below, is an "output conclusion", or "ruling conclusion". In one sense, the output conclusion is the conclusion or group of conclusions on the basis of which the electronic response/s hereinafter described is/are provided.

The method may include noting, as a threshold value, the value of T2 minus T3 (i.e. the second temperature difference) when the conclusion that there is no flow in the conduit has been derived. The conclusion that there is no flow in the conduit may then continue to override any conclusion derived on the basis of the first temperature difference, until the value of T2 minus T3 is below the noted threshold value for T2 minus T3.

Alternatively, the method may include comparing the value of T2 minus T3 (i.e. the second temperature difference) to a threshold value to derive a conclusion that there is no flow in the conduit. The conclusion that there is no flow in the conduit may then continue to override any conclusion derived on the basis of the first temperature difference, until the value of T2 minus T3 is below the noted threshold value for T2 minus T3.

The method may further include artificially generating at a third heating point along the conduit wall, which is defined between the first heating point and the second heating point at an angular spacing of less than 90° from the first heating point about the longitudinal axis, a third locally heated spot on the interior surface of the conduit wall, by means of heat delivered to the conduit wall by a heating device at a third heating power level that is maintained substantially constant over time;

locally measuring the temperature of the third heated spot and thereby obtaining a fourth temperature value T4;

communicating an electronically generated signal carrying the value T4 to the computing device, which electronically automatically calculates a third temperature difference T4 minus T2; and automatically derives a conclusion of the condition of slurry flow prevailing in the conduit at the third heated spot, based on the relationship between the value of the third temperature difference and a third reference parameter, which is a reference parameter for the third temperature difference.

The steps outlined in the preceding paragraph may be carried out in respect of fourth and, optionally, further heating points along the conduit wall, defined between the first and second heating points. In other words, fourth and, optionally, further locally heated spots may be generated on the interior surface of the conduit. The method may then include obtaining fifth and, optionally, further temperature values T5 . . . Tn by local measurement of the temperatures of the fourth and optional further heated spots;

communicating (an) electronically generated signal/s carrying the value/s T5 . . . Tn to the computing device, which electronically automatically calculates fourth and, optionally, further temperature differences T5 minus T2 . . . Tn minus T2; and automatically derives one or more further conclusions of the conditions of slurry flow prevailing in the conduit at the fourth and optional further heated spots, based on the relationship between the value/s of the fourth and optional further temperature differences and fourth and optional further reference parameter/s, which is/are (a) reference parameter/s for each of the fourth and optional further temperature differences respectively.

Each of the first, third, fourth and optional further reference parameters, when employed, may be a predetermined desired value of each of the first, third, fourth and optional further temperature differences. The method may then include concluding, by means of the computing device, that the condition of slurry flow in the conduit is that a settled particle bed has formed inside the conduit at one or more of the first, third, fourth and optional further heated spots on the basis that, respectively, one or more of the first, third fourth and optional further temperature differences is/are greater than their respective predetermined desired values, optionally greater than predetermined standard allowable deviations from their respective predetermined desired values. Preferably, the predetermined desired value of each of the first, third, fourth and optional further temperature differences is 0 (zero).

Any conclusion derived on the basis of each of the first, third, fourth and optional further temperature differences may override any conclusion derived on the basis of the second temperature difference, and therefore be the output conclusion or provide a group of output conclusions, until any change noted in the second temperature difference over the predetermined time period is equal to, or exceeds the predetermined undesired change over the predetermined time period. At such a time, the conclusion derived on the basis of the second temperature difference will become the output conclusion.

Measuring the temperatures of the respective heated spots may be effected independently of the heating devices that provide the respective heating spots.

The method may include providing or causing, by means or under direction of the computing device, an electronic response to at least the following conclusions, when derived by the computing device in the manner hereinbefore described:

that there is no flow in the conduit; and that a settled particle bed has formed in the conduit at the locally heated spot from which the temperature value that is used to calculate the temperature difference on the basis of which the conclusion of the formation of a settled particle bed is derived, is obtained.

In other words, for the latter conclusion, respective electronic responses may be provided for respective conclusions that settled beds have formed at the first, third, fourth and optional further heated spots respectively. It will be appreciated that settled beds forming at the third, fourth and optional further heated spots are dependent on the formation of a settled bed at the first heated spot, taking into account that the formation of settled beds at the third, fourth and optional further heated spots requires the formation of a settled bed at the first heated spot, at least in the preferred configuration of locations of the first, second, third, fourth and optional further heated points as discussed below.

The electronic response may be or cause a visual and/or audio indication that the conclusion causing the electronic response has been derived by the computing device. Visual indications may include warning lights. Visual indications may also include text or graphic representations on a computer screen or other electronic display.

It must be appreciated that conclusions derived of the conditions of slurry flow prevailing in the conduit at the third, fourth and optional further heated spots provides an indication of the profile of a settled bed that may have formed in the conduit. Thus, if the conclusions derived from the first and third temperature differences are that settled beds have formed at the first and third heated spots, but the conclusion derived from the fourth temperature difference is not that a settled bed has formed at the fourth heated spot, an indication is obtained that the depth of the settled particle bed is only up to the third heated spot.

The reference point, when defined, may be defined on the conduit wall. The reference temperature may therefore be a temperature of the conduit wall. Preferably, no artificial heating is supplied at the reference point.

The spacings between the reference point, the first, second, third, fourth and the optionally further heating points, whichever are defined, are preferably only angular, not longitudinal or axial along the conduit. In other words, the reference point and all of the heating points preferably all lie in the same cross sectional plane of the conduit. The angular spacing between the first and second heating points is preferably 120°. In such a case, when the reference point is defined on the conduit, the first, second and reference points are preferably equiangularly spaced from each other, i.e. at angular spacings of 120°. The third, fourth and optional further heating points preferably all lie on the same side between the first and second heating points. This side is preferably the side of smallest angular spacing between the first and second heating points.

The temperature of each heated spot may be locally measured at its heating point. Measurement may, in particular, be effected in substantially the same plane in which each heating point and heating spot is located. Alternatively, measurement may be effected in a plane slightly upstream of the plane is which the heating point and heating spot is located, e.g. 15 mm upstream therefrom. It will be appreciated that this may, however, still be regarded as effectively being in the "same plane", depending on how thick the plane is regarded to be. The reference temperature may be measured at the reference point.

The heating power level/s of the heating device/s may be selected with reference to the reference temperature, such that the actual temperature/s of working surface/s of the heating device/s is/are, in each case, higher than the reference temperature. Preferably, the actual temperature/s of working surface/s of the heating device/s is/are, in each case, about 5° C. to about 10° C. higher than the reference temperature. In this regard, the term "working surface" refers to a surface of the heat source that is in contact with the conduit wall, typically on an outside thereof, to deliver heat to the interior of the conduit wall by conductive heat transfer. The heating power levels of all of the heating devices are preferably equal, such that the actual temperatures of the respective working surfaces are also equal, at least at full flow.

The conduit may be substantially horizontal. It is well established that a conduit, or pipe, inclination of 30 degrees to the horizontal requires a higher velocity to prevent particle settling than a horizontal conduit, or pipe.

The conduit may be a pipe. Typically, the pipe may have a wall thickness of about 2 to about 20 mm.

In some embodiments, there is provided a slurry flow condition monitoring system for electronically deriving a conclusion of the condition of slurry flow in a non-vertical conduit having a conduit wall and which contains a slurry to flow or flowing along the conduit, the system including at least one heating device that is arranged to deliver heat to the conduit wall at a first heating point along the conduit wall, which is defined at the invert of the conduit, thereby artificially to generate, in use, a first locally heated spot on an interior surface of the conduit wall by delivering heat to the conduit wall at a first heating power level that is maintained substantially constant over time; and a second heating point along the conduit wall, which is defined angularly spaced from the first heating point at an angular spacing of at least 900, thereby artificially to generate, in use, a second locally heated spot on an interior surface of the conduit wall by delivering heat to the conduit wall at a second heating power level that is substantially constant over time, the system further including first and second temperature sensors that are arranged locally to measure, in use, the temperatures of the first and second heated spots respectively, thereby to obtain first and second temperature values (respectively T1 and T2);

electronic signal generating means capable of electronically generating, in use, signals carrying the values T1 and T2; and a computing device that is in communication with the electronic signal generating means operatively to receive the signals carrying the values T1 and T2, the computing device being programmed electronically to automatically calculate a first temperature difference T1 minus T2; and to automatically derive a conclusion of slurry flow conditions prevailing in the conduit, based at least on the relationship between the value of the first temperature difference and a first reference parameter, which is a reference parameter for the first temperature difference.

The system may be a system for implementing the method of the invention. Accordingly, parts of the system may be such that they are capable of implementing the method of the invention, therefore having functionalities corresponding to the steps and features of the method hereinbefore described.

The system may include

- a third temperature sensor that is arranged to measure a third, reference temperature at a reference point spaced from the first and second heating points, thereby to obtain a third, reference temperature value (T3); and
- electronic signal generating means capable of electronically generating, in use, a signal carrying the value T3, wherein the computing device is in communication with the electronic signal generating means operatively to receive the signal carrying the value T3 and is programmed electronically

- to automatically calculate a second temperature difference T3 minus T2; and
- to automatically derive a conclusion of slurry flow conditions prevailing in the conduit based also on the relationship between the value of the second temperature difference or of T2 and a second reference parameter, which is a reference parameter for the second temperature difference or for T2.

The second reference parameter may be a predetermined threshold value for the second temperature difference. For example, the second reference parameter may be predetermined at 8° C., thus requiring the second temperature difference to be, at most, 8° C.

The computing device may then be programmed electronically to

- automatically compare, by means of the computing device, the second temperature difference to the second reference parameter; and
- automatically conclude, by means of the computing device, that the condition of slurry flow in the conduit is that there is no flow in the conduit, on the basis that the second temperature difference exceeds the second reference parameter.

Alternatively, the second reference parameter may be a threshold value for T2 and may be calculated as a predetermined value above the measured value for T3. For example, the predetermined value above the measured value of T3 may be 8° C. Therefore, the second reference parameter may be T3 plus 8° C.

The computing device may then be programmed electronically to

- automatically compare, by means of the computing device, T2 to the second reference parameter; and
- automatically conclude that the condition of slurry flow in the conduit is that there is no flow in the conduit, on the basis that T2 exceeds the second reference parameter.

Alternatively second reference parameter may be a predetermined undesired change in the second temperature difference over a predetermined time period. In such a case the computing device may be programmed electronically

- to automatically note changes in the second temperature difference; and
- to automatically conclude that the condition of slurry flow in the conduit is that there is no flow in the conduit, on the basis that a change in the second temperature difference over the predetermined time period is equal to, or exceeds the predetermined undesired change over the predetermined time period.

The computing device may be programmed such that the conclusion derived on the basis of the second temperature difference that there is no flow in the conduit, overrides any conclusion derived on the basis of the first temperature difference.

The computing device may be electronically programmed automatically to use a threshold value for the value of T2 minus T3 to derive at a conclusion that there is no flow in the conduit. The computing device may also be programmed such that the conclusion derived on the basis of the second temperature difference that there is no flow in the conduit, continues to override any conclusion drawn on the basis of the first temperature difference until the value of T2 minus T3 is below the threshold value of T2 minus T3.

The system may also include

- a heating device arranged to deliver heat to the conduit wall at a third heating point along the conduit wall, which is defined between the first heating point and the second heating point at an angular spacing of less than 90° from the first heating point, thereby artificially to generate a third locally heated spot on the interior surface of the conduit wall at a third heating power level that is maintained substantially constant over time;
- a fourth temperature sensor that is arranged locally to measure, in use, the temperature of the third heated spot, thereby to obtain a fourth temperature value (T4);
- electronic signal generating means capable of electronically generating, in use, a signal carrying the value T4 and of communicating the signal to the computing device, the computing device being in communication with the electronic signal generating means operatively to receive the electronically generated signal carrying the value T4 and being programmed electronically
  - to automatically calculate a third temperature difference T4 minus T2; and
  - to automatically derive a conclusion of slurry flow conditions prevailing in the conduit at the third heated spot, based at least on the relationship between the value of the third temperature difference and a third reference parameter, which is a reference parameter for the third temperature difference.

Furthermore, the system may also include

- one or more heating devices arranged to deliver, at heating levels that are maintained constant over time, heat to the conduit wall at fourth and, optionally, further heating points along the conduit wall, between the first heating point and the second heating point, thereby artificially to generate fourth and, optionally, further locally heated spots on the interior surface of the conduit;
- one or more temperature sensors arranged locally to measure, in use, the temperatures of the fourth and optionally further heated spots respectively, thereby to obtain fifth and, optionally, further temperature values (T5 . . . Tn);
- electronic signal generating means capable of electronically generating, in use, (a) signal/s carrying the value/s T5 . . . Tn and of communicating the signal/s to the computing device, the computing device being in communication with the electronic signal generating means operatively to receive the electronically generated signal/s carrying the value/s T5 . . . Tn and being programmed electronically
  - to automatically calculate fourth and optionally further temperature difference/s T5 minus T2 . . . Tn minus T2; and
  - to automatically derive a conclusion of slurry flow conditions prevailing in the conduit at the fourth and optionally further heated spot/s, based at least on the relationship between the value of (a) fourth and optionally further temperature difference/s and (a)

fourth and optionally further reference parameter/s, which is/are a reference parameter/s for the fourth and optionally further temperature difference/s respectively.

Each of the first, third, fourth and optional further reference parameters, when employed, may be a predetermined desired value of each of the first, third, fourth and optional further temperature differences. The computing device may be programmed electronically to conclude that the condition of slurry flow in the conduit is that a settled particle bed has formed inside the conduit at one or more of the first, third, fourth and optional further heated spots on the basis that, respectively, one or more of the first, third fourth and optional further temperature differences is/are greater than their respective predetermined desired values, optionally greater than predetermined standard allowable deviations from their respective predetermined desired values. Preferably, the predetermined desired value of each of the first, third, fourth and optional further temperature differences is 0 (zero).

The computing means may be programmed such that any conclusion derived on the basis of each of the first, third, fourth and optional further temperature differences overrides any conclusion derived on the basis of the second temperature difference, until any change noted in the second temperature difference over the predetermined time period is equal to, or exceeds the predetermined undesired change over the predetermined time period.

The computing means may be programmed to provide or cause an electronic response to at least the following conclusions, when derived by the computing device:

that there is no flow in the conduit; and that a settled particle bed has formed in the conduit at the locally heated spot from which the temperature value that is used to calculate the temperature difference on the basis of which the conclusion of the formation of a settled particle bed is derived, is obtained.

The system may include audio and/or visual indicating means. The electronic response may be or cause the indicating means to provide a visual and/or audio indication that the conclusion causing the electronic response has been derived by the computing device. Visual indicating means may include warning lights. Visual indicating means may also refer to computer screens, on which text or graphic representations are provided as indications screens.

The first and second heating points may both lie in the same cross-sectional plane of the conduit. The reference point, when defined, may be defined on the conduit wall and may also lie in the same cross-sectional plane as the first and second heating points. The third, fourth and further heating points (when defined) may also lie in the same cross-sectional plane as the first and second heating points.

In some embodiments, there is provided method of electronically deriving a conclusion of the condition of slurry flow in a non-vertical conduit having a conduit wall and which contains a slurry to flow or flowing along the conduit, the method including artificially generating at a first heating point along the conduit wall, which is defined at the invert of the conduit, a first locally heated spot on an interior surface of the conduit wall, by means of heat delivered to the conduit wall by a heating device at a first heating power level W1;

artificially generating at a second heating point along the conduit wall, which is defined angularly spaced from the first heating point at an angular spacing of at least 90°, a second locally heated spot on the interior surface of the conduit wall by means of heat delivered to the conduit wall by a heating device at a second heating power level W2, one of the heating power levels W1, W2 being substantially constant over time, locally measuring the temperatures of the first and second locally heated spots respectively, thereby obtaining first and second temperature values (respectively T1 and T2);

communicating electronically generated signals carrying the values T1 and T2 to an electronic computing device, which operatively receives the signals and electronically automatically calculates a first temperature difference T1 minus T2; and comparing, by means of the computing device, the first temperature difference to a desired constant for the first temperature difference;

selectively increasing or decreasing, by means of the computing device, heat delivered to the heating device that does not deliver constant heating power over time, to maintain the desired constant for the first temperature difference; and calculating, by means of the computing device, a first power level difference W1 minus W2 and automatically deriving a conclusion of the condition of slurry flow prevailing in the conduit based at least on the relationship between the value of the first power level difference and a first reference parameter, which is a reference parameter for the first power level difference.

Preferably W1 is constant and W2 is variable, and is varied as necessary in accordance with the method, over time.

This embodiment is regarded as a less desirable embodiment. The applicant has noticed that with presently available equipment, undesirable delays occur in the response of heating devices to maintain a constant temperature difference. This results in inaccurate conclusions being derived of the condition of slurry flow in the conduit. Nevertheless, this embodiment is presented as a possible alternative.

The desired constant for the first temperature difference may be the temperature difference between the first and second heated spots when there is full flow in the conduit.

The method may include measuring a reference temperature T3, as in the method hereinbefore described as the first aspect of the invention, and using the reference temperature in the same manner hereinbefore described to derive a conclusion of no flow in the conduit, while the first power difference is used to derive a conclusion of the formation of a settled particle bed in the conduit. The reference parameter for the first power difference is, preferably, 0 (zero).

The method may also include employing third, optional fourth and optional further heating devices, in the same manner described for the first aspect of the invention, thereby to generate third, optional fourth and optional further heated spots with variable power delivery. The method may then include locally measuring third, optional fourth and optional further temperatures of the third, optional fourth and optional further heated spots, and calculating third, optional fourth and optional further temperature differences T4 minus T2, T5 minus T2 . . . Tn minus T2. The method may then further include measuring third, optional fourth and optional further power levels W3, W4 . . . Wn and calculating second, optional third and optional further power level differences between W1 and W3, W1 and optional W4 . . . W1 and optional Wn, resulting when controlling W3, W4 . . . Wn to maintain third, fourth and optional further temperature differences T4 minus T2, T5 minus T2 . . . Tn minus T2 substantially constant and thereby to derive conclusions of slurry flow conditions prevailing at other locations in the conduit, in the same cross sectional plane in which the first and second heating devices are located.

In some embodiments, there is provided a system for implementing the method of the third aspect of the invention, including appropriate heating devices, temperature sensors and an appropriately programmed computing device.

In some embodiments, there is provided a method of electronically deriving a conclusion of a condition of slurry flow in a non-vertical conduit having a conduit wall and which contains a slurry to flow or flowing along the conduit, the method comprising:

- artificially generating at a first heating point on the conduit wall, which is defined at the invert of the conduit, a first locally heated spot on an interior surface of the conduit wall, using heat delivered to the conduit wall by a first heating device at a first variable heating power level W1 that is substantially constant over time;
- artificially generating at a second heating point on the conduit wall, which is defined angularly spaced from the first heating point at an angular spacing of at least 900 and which is not spaced from the first heating point along the length of the conduit but which lies in the same cross-sectional plane of the conduit as the first heating point, a second locally heated spot on the interior surface of the conduit wall using heat delivered to the conduit wall by a second heating device at a second variable heating power level W2 that is substantially constant over time;
- locally measuring the temperatures of the first and second locally heated spots respectively, thereby obtaining a first temperature value T1 and a second temperature value T2;
- measuring, at a predetermined reference point spaced from the first and second heating points, a third reference temperature value T3;
- communicating electronically generated signals carrying the values W1, W2, T1, T2, and T3 to one or more electronic computing devices, which operatively receive/s the signals and electronically:
  - automatically
    - calculate/s a first temperature difference dT1 between T1 and T3 and compare/s dT1 to a reference value for dT1, being dT1ref, or
    - compare/s T1 to a desired value for T1, being T3" that is T3 plus a predetermined value T3',
  - automatically cause/s the first heating device to change the heating power level W1 delivered to the conduit wall at the first heating point if
    - dT1 is not equal to dT1ref, optionally not within an allowable deviation of dT1ref, sufficiently to change T1 such that dT1 is equal to dT1ref, optionally within an allowable deviation of dT1ref, or
    - T1 is not equal to T3", optionally within an allowable deviation of T3", sufficiently to change T1 such that T1 is equal to T3", optionally within an allowable deviation of T3" automatically
    - calculate/s a second temperature difference dT2 between T2 and T3 and compare/s dT2 to a reference value for dT2, being dT2ref, or
    - compare/s T2 to a desired value for T2, being T3"" that is T3 plus a predetermined value T3'";
  - automatically cause/s the second heating device to change the heating power level W2 delivered to the conduit wall at the second heating point if
    - dT2 is not equal to dT2ref, optionally not within an allowable deviation of dT2ref, sufficiently to change T2 such that dT2 is equal to dT2ref, optionally within an allowable deviation of dT2ref, or;
    - T2 is not equal to T3"", optionally within an allowable deviation of T3"", sufficiently to change T1 such that T1 is equal to T3"", optionally within an allowable deviation of T3"";
  - automatically calculate/s a power difference dW between W1 and W2 and compare/s dW to a reference value for dW, being dWref;
  - automatically compare/s W2 to a reference value for W2, being W2ref, and
  - automatically derive/s a conclusion of a condition of slurry flow prevailing in the conduit based at least on a relationship between dW and dWref and between W2 and W2ref, that
    - if an absolute value of dW is smaller than an absolute value of dWref and an absolute value of W2 is greater than an absolute value of W2ref, there is unrestricted flow in the conduit, in that no flow restricting bed of solid material has formed at the invert of the conduit,
    - if an absolute value of dW is greater than an absolute value of dWref and an absolute value of W2 is greater than an absolute value of W2ref, there is partially restricted flow in the conduit, in that a flow restricting bed of solid material has formed at the invert of the conduit, and
    - if an absolute value of W2 is smaller than an absolute value of W2ref, there is restricted flow in the conduit, in that flow in the conduit has virtually ceased.

That W1 and W2 are substantially constant over time would typically apply at unrestricted flow in the conduit, since W1 and W2 would be varied when there is a change in flow conditions in the conduit in accordance with the method of the invention.

One or more, or all, of the following conditions may typically apply to W2ref, dWref, W1 at unrestricted flow, and W2 at unrestricted flow:

W2ref>0

W2ref>dWref>0

W2>W2ref at unrestricted flow

W1=W2 at unrestricted flow.

The method may also include employing third, optional fourth and optional further heating devices, in the same manner described above for W2, thereby to generate third, optional fourth and optional further heated spots with variable power delivery W3, W4, . . . Wn that are maintained substantially constant over time, at unrestricted flow. These may be provided along the circumference of the conduit, in the same cross-sectional plane as the heating devices providing W1 and W2, at selected points between the heating devices providing W1 and W2 and, thus, angularly spaced relative to the heating devices providing W1 and W2.

The method may then include locally measuring third, optional fourth and optional further temperatures T4, T5 . . . Tn of the third, optional fourth and optional further heated spots, and calculating third, optional fourth and optional further temperature differences T4 minus T3 (dT3), T5 minus T3 (dT4 . . . Tn minus T3 (dTn).

The method may then further include comparing dT3, dT4 . . . dTn to reference values for dT3, dT4 . . . dTn, being dT3ref, dT4ref . . . dTnref, or comparing T4, T5 . . . Tn to a desired value for each of T4, T5 . . . Tn.

The method may then further include causing the third heating device to change the heating power level W3, W4 . . . Wn delivered to the conduit wall respectively if dT3, dT4 . . . dTn respectively are not equal to dT3ref, dT4ref . . . dTnref respectively, optionally not within an allowable deviation of dT3ref, dT4ref . . . dTnref respectively, sufficiently to change T4, T5 . . . Tn respectively such that dT3, dT4 . . . dTn respectively are equal to dT3ref, dT4ref . . . dTnref respectively, optionally within an allowable deviation of dT3ref, dT4ref . . . dTnref respectively, or;

T4, T5 . . . Tn respectively are not equal to, optionally within an allowable deviation of, the desired values thereof, sufficiently to change T4, T5 . . . Tn respectively such that T4, T5 . . . Tn respectively are equal to, optionally within an allowable deviation of, their respective desired values;

The method may then include calculating respective power differences dW3, dW4 . . . dWn between W2 and W3, W4 . . . Wn respectively, and comparing dW3, dW4, dWn respectively to respective reference values for dW3, dW4 . . . dWn, being dW3ref, dW4ref . . . dWnref.

The method may then include deriving a conclusion of a condition of slurry flow prevailing in the conduit based relationships between dW3, dW4 . . . dWn and dW3ref, dW4ref . . . dWnref respectively, that if absolute values of any of dW3, dW4 . . . dWn respectively are smaller than absolute values of dW3ref, dW4ref . . . dWnref and an absolute value of W2 is greater than an absolute value of W2ref, there is unrestricted flow in the conduit at the locations of the heating devices providing W3, W4 . . . Wn respectively, in that no flow restricting bed of solid material has formed at the locations of the relevant heating devices providing W3, W4 . . . Wn respectively, and if absolute values of any of dW3, dW4 . . . dWn respectively are greater than absolute values of dW3ref, dW4ref . . . dWnref and an absolute value of W2 is greater than an absolute value of W2ref, there is partially restricted flow in the conduit, in that a flow restricting bed of solid material has formed at the locations of the relevant heating devices providing W3, W4 . . . Wn respectively.

In this context, one or more, or all, of the following may apply

W2ref>dW3ref, dW4ref . . . dWnref>0 dW3ref, dW4ref . . . dWnref may each be equal to dWref,

W3, W4 . . . Wn may each be equal to W1 and W2 at unrestricted flow.

IN ACCORDANCE WITH A SIXTH ASPECT OF THE INVENTION is provided a slurry flow condition monitoring system for electronically deriving a conclusion of a condition of slurry flow in a non-vertical conduit having a conduit wall and which contains a slurry to flow or flowing along the conduit, the system including:

a first heating device that is arranged and configured to deliver heat to the conduit wall at a first heating point on the conduit wall, which is defined at the invert of the conduit, thereby artificially to generate a first locally heated spot on an interior surface of the conduit wall by delivering heat to the conduit wall at a first variable heating power level W1 that is substantially constant over time, and a second heating device that is arranged and configured to deliver heat to the conduit wall at a second heating point on the conduit wall, which is defined angularly spaced from the first heating point at an angular spacing of at least 90° and which is not spaced from the first heating point along the length of the conduit but which lies in the same cross-sectional plane of the conduit as the first heating point, thereby artificially to generate a second locally heated spot on an interior surface of the conduit wall by delivering heat to the conduit wall at a second variable heating power level W2 that is substantially constant over time;

first and second temperature sensors that are arranged locally and configured to measure the temperatures of the first and second heated spots respectively, thereby to obtain a first temperature value T1 and a second temperature value T2;

a third temperature sensor that is arranged and configured to measure a third reference temperature at a reference point spaced away from the first and second heating points, thereby to obtain a third reference temperature value T3;

electronic signal generating means capable of electronically generating signals carrying the values W1, W2, T1, T2 and T3; and one or more computing devices in communication with the electronic signal generating means operatively configured to receive the signals carrying the values W1, W2, T1, T2 and T3, the one or more computing devices being programmed electronically and configured to:

automatically calculate a first temperature difference dT1 between T1 and T3 and compare dT1 to a reference value for dT1, dT1ref, or compare T1 to a desired value for T1, T3", that is T3 plus a predetermined value T3', automatically cause the first heating device to change the heating power level W1 delivered to the conduit wall at the first heating point if dT1 is not equal to dT1ref, optionally not within an allowable deviation of dT1ref, sufficiently to change T1 such that dT1 is equal to dT1ref, optionally within an allowable deviation of dT1ref, or T1 is not equal to T3", optionally within an allowable deviation of T3", sufficiently to change T1 such that T1 is equal to T3", optionally within an allowable deviation of T3"

automatically calculate a second temperature difference dT2 between T2 and T3 and compare dT2 to a reference value for dT2, dT2ref, or compare T2 to a desired value for T2, T3"", that is T3 plus a predetermined value T3'";

automatically cause the second heating device to change the heating power level W2 delivered to the conduit wall at the second heating point if dT2 is not equal to dT2ref, optionally not within an allowable deviation of dT2ref, sufficiently to change T2 such that dT2 is equal to dT2ref, optionally within an allowable deviation of dT2ref, or;

T2 is not equal to T3" ", optionally within an allowable deviation of T3" ", sufficiently to change T1 such that T1 is equal to T3" ", optionally within an allowable deviation of T3" ";

automatically calculate a power difference dW between W1 and W2 and compare dW to a reference value for dW, dWref;

automatically compare W2 to a reference value for W2, W2ref, and automatically derive a conclusion of a condition of slurry flow prevailing in the conduit based at least on a relationship between dW and dWref and between W2 and W2ref, that if an absolute value of dW is smaller than an absolute value of dWref and an absolute value of W2 is greater than an absolute value of W2ref, there is unrestricted flow in the conduit, in that no flow restricting bed of solid material has formed at the invert of the conduit, if an absolute value of dW is greater than an absolute value of dWref and an absolute value of W2 is greater than an absolute value of W2ref, there is partially restricted flow in the conduit, in that a flow restricting bed of solid material has formed at the invert of the conduit, and if an absolute value of W2 is smaller than an absolute value of W2ref, there is restricted flow in the conduit, in that flow in the conduit has virtually ceased. That W1 and W2 are substantially constant over time would typically apply at unrestricted flow in the conduit, since W1 and W2 would be varied when there is a change in flow conditions in the conduit in accordance with the method of the invention.

That W1 and W2 are substantially constant over time would typically apply at unrestricted flow in the conduit, since W1 and W2 would be varied when there is a change in flow conditions in the conduit in accordance with the method of the invention.

One or more, or all, of the following conditions may typically apply to W2ref, dWref, W1 at unrestricted flow, and W2 at unrestricted flow:

$W2ref > 0$ $W2ref > dWref > 0$ $W2 > W2ref$ at unrestricted flow $W1 = W2$ at unrestricted flow.

The configuration of the system may also include employing third, optional fourth and optional further heating devices, in the same manner described above for either W1 or W2, thereby to generate third, optional fourth and optional further heated spots with variable power delivery W3, W4, . . . Wn that are maintained substantially constant over time, at unrestricted flow. These may be provided along the circumference of the conduit, in the same cross-sectional plane as the heating devices providing W1 and W2, at selected points between the heating devices providing W1 and W2 and, thus, angularly spaced relative to the heating devices providing W1 and W2.

The configuration of the system and the programming and configuration of the computing device may then include locally measuring fourth, optional fifth and optional further temperatures T4, T5 . . . Tn of the third, optional fourth and optional further heated spots, and calculating third, optional fourth and optional further temperature differences T4 minus T3 (dT3), T5 minus T3 (dT4 . . . Tn minus T3 (dTn).

The programming and configuration of the computing device may then further include comparing dT3, dT4 . . . dTn to reference values for dT3, dT4 . . . dTn, being dT3ref, dT4ref . . . dTnref, or comparing T4, T5 . . . Tn to a desired value for each of T4, T5 . . . Tn.

The programming and configuration of the computing device may then further include causing the second heating device to change the heating power level W3, W4 . . . Wn delivered to the conduit wall respectively if dT3, dT4 . . . dTn respectively are not equal to dT3ref, dT4ref . . . dTnref respectively, optionally not within an allowable deviation of dT3ref, dT4ref . . . dTnref respectively, sufficiently to change T4, T5 . . . Tn respectively such that dT3, dT4 . . . dTn respectively are equal to dT3ref, dT4ref . . . dTnref respectively, optionally within an allowable deviation of dT3ref, dT4ref . . . dTnref respectively, or;

T4, T5 . . . Tn respectively are not equal to, optionally within an allowable deviation of, the desired values thereof, sufficiently to change T4, T5 . . . Tn respectively such that T4, T5 . . . Tn respectively are equal to, optionally within an allowable deviation of, their respective desired values.

The programming and configuration of the computing device may then include calculating respective power differences dW3, dW4 . . . dWn between W2 and W3, W4 . . . Wn respectively, and comparing dW3, dW4, dWn respectively to respective reference values for dW3, dW4 . . . dWn, being dW3ref, dW4ref . . . dWnref.

The programming and configuration of the computing device may then include deriving a conclusion of a condition of slurry flow prevailing in the conduit based relationships between dW3, dW4 . . . dWn and dW3ref, dW4ref . . . dWnref respectively, that if absolute values of any of dW3, dW4 . . . dWn respectively are smaller than absolute values of dW3ref, dW4ref . . . dWnref and an absolute value of W2 is greater than an absolute value of W2ref, there is unrestricted flow in the conduit at the locations of the heating devices providing W3, W4 . . . Wn respectively, in that no flow restricting bed of solid material has formed at the locations of the relevant heating devices providing W3, W4 . . . Wn respectively, and if absolute values of any of dW3, dW4 . . . dWn respectively are greater than absolute values of dW3ref, dW4ref . . . dWnref and an absolute value of W2 is greater than an absolute value of W2ref, there is partially restricted flow in the conduit, in that a flow restricting bed of solid material has formed at the locations of the relevant heating devices providing W3, W4 . . . Wn respectively.

In this context, one or more, or all, of the following may apply $W2ref > dW3ref, dW4ref \ldots dWnref > 0$ dW3ref, dW4ref . . . dWnref may each be equal to dWref, W3, W4 . . . Wn may each be equal to W1 and W2 at unrestricted flow.

BRIEF DESCRIPTION OF THE DRAWINGS

The invention will now be described by way of illustrative example only, with reference to the accompanying diagrammatic drawings in which.

DETAILED DESCRIPTION OF THE INVENTION

Figure 1:
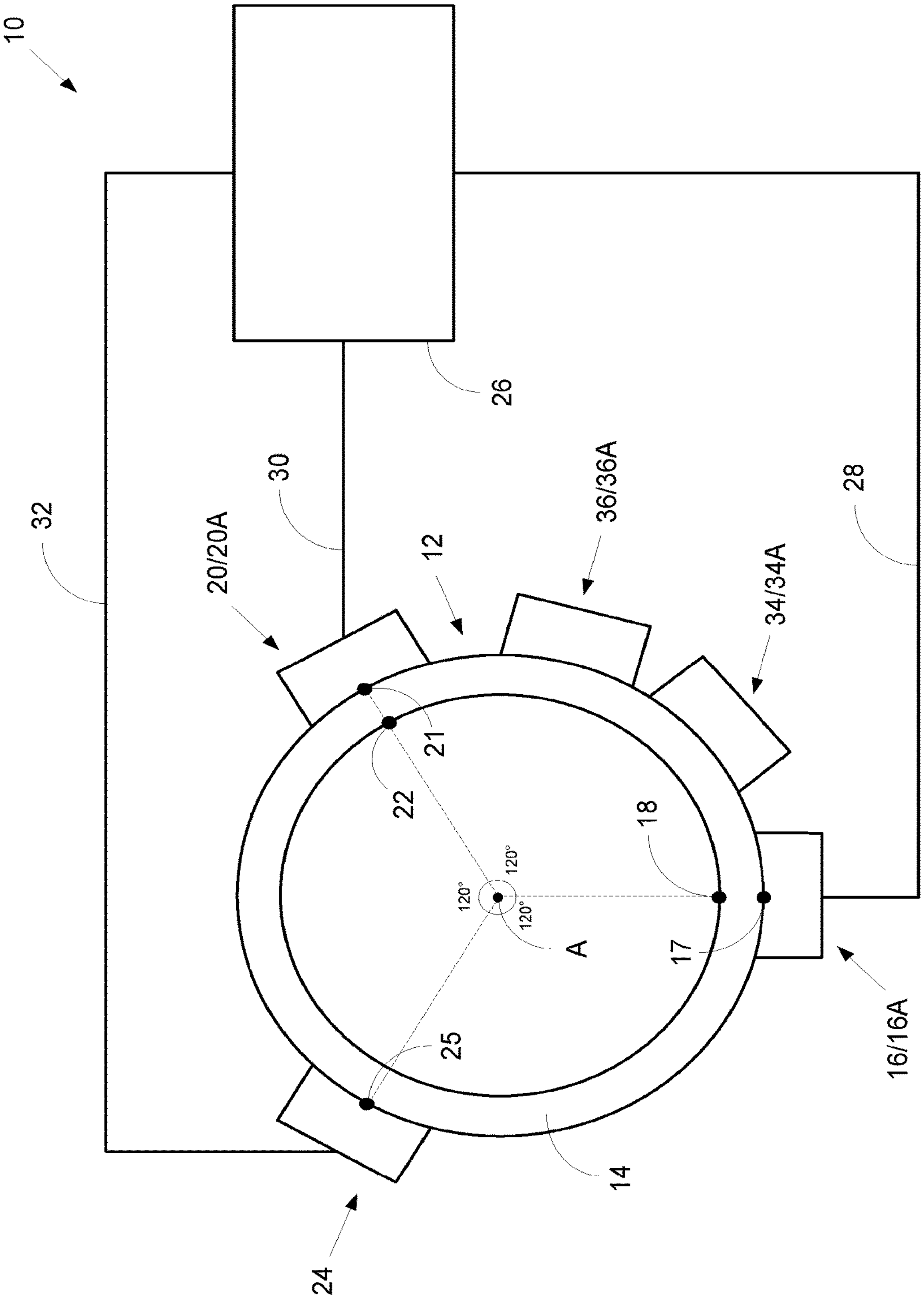
FIG. 1 shows, in cross sectional view, a system in accordance with the second aspect of the invention in conjunction with a conduit in the form of a pipe.

Referring to the drawings, and particularly to FIG. 1, reference numeral 10 generally indicates a slurry flow condition monitoring system in accordance with the second aspect of the invention.

The system 10 includes a conduit in the form of a pipe 12. The pipe 12 has a conduit wall which is a pipe wall 14, having a thickness of between about 2 and about 20 mm, both values inclusive. The pipe 12 is circular cylindrical.

A first heating device 16 is mounted on an exterior surface of the pipe wall 14 at the invert of the pipe. The first heating device 16 has a heated working surface that is in contact with the exterior surface of the pipe wall 14 at a first heating point 17 along the exterior surface of the pipe wall 14, and delivers heat to the pipe wall 14 at the first heating point 17. It will be appreciated that the first heating point 17 is at the invert of the pipe 12. The first heating device 16 delivers heat to the pipe wall 14 at a first heating power level that is maintained substantially constant over time. The delivery of heat to the exterior surface of the pipe wall 14 by the first heating device 16 at the first heating point 17 results in a first locally heated spot 18 being artificially generated on an interior surface of the pipe wall 14 due to conductive heat transfer through the pipe wall 14.

A second heating device 20 is also mounted on the exterior surface of the pipe wall 14. The second heating device 20 also has a heated working surface that is in contact with the exterior surface of the pipe wall 14 at a second heating point 21 along the exterior surface of the pipe wall 14, and delivers heat to the pipe wall 14 at the second heating point 21. The second heating device delivers heat to the pipe wall 14 at a second heating power level that is equal to the first heating power level and is also maintained substantially constant over time. As in the case of the first heating device 16, the delivery of heat to the exterior surface of the pipe wall 14 by the second heating device 20 artificially generates a second locally heated spot 22 on the interior surface of the pipe wall 14 due to conductive heat transfer through the pipe wall 14.

The first and second heating points 17, 21 are angularly spaced from each other about a central longitudinally extending axis ‘A’ of the pipe 12. Relative mounting of the first heating device 16 and the second heating device 20 about the axis A is therefore also such that the first and second heated spots 18, 22 are generated at locations that are equally angularly spaced from each other about the axis ‘A’. The angular spacing is, in accordance with the invention, at least 90°. It is, however, preferred that the angular spacing is greater than 90°. Most preferably, and as illustrated in FIG. 1, the angular spacing is 120°.

The system 10 also includes first and second temperature sensors 16A, 20A that are arranged locally to measure the temperature of each of the first and second heated spots 18, 22 respectively, thereby to obtain first and second temperature values T1, T2. This measurement is independent of the first and second heating devices 16, 20. Since the first and second temperature sensors 16A, 20A operate in close proximity to the heating devices 16, 20, however, the first and second temperature sensors 16A, 20A are illustrated as being included in the heating devices 16, 20. This is merely to simplify the drawing and would not necessarily hold true in practice.

The temperatures of the first and second heated spots 18, 22 are measured at the respective heating points 17, 21 in substantially the same plane, or in a plane slightly upstream of the plane in which the heating points 17, 21 and heating spots 18, 22 are located, e.g. 15 mm upstream therefrom. The temperature measurement is preferably continuous or at predetermined intervals over time.

In a particular embodiment of the invention, all of the heating devices and their associated temperature sensors are mounted a distance of 15 mm from each other (centre to centre) on an aluminium base plate. This base plate is then water-tightly screwed to a head, which also provides a cable gland. Cable ends are soldered onto contact points on the base plate. 3 cores are needed to control of heat created by the transistor, and two cores for the sensor, which is desirably a Pt100 sensor. The heads should be mounted such that their cable glands point downstream of the flow in the pipe 12, so that the Pt100 is 15 mm upstream of the heating device. Then the heating devices are on exactly the same cross sectional plane, whereas all three temperature sensors are in their own plane, which is however still functionally speaking in the same plane as the heating devices, also depending on how thick the plane is defined to be. The base plate is typically 3 mm thick.

The system 10 further includes a reference temperature sensor 24. While the inclusion of this reference temperature sensor 24 is optional in accordance with the invention, it is preferred that it is included. The reference temperature sensor 24 is provided at a reference point 25, which is a point along the pipe wall 14, and measures a reference temperature to obtain a reference temperature value T3. The reference temperature is therefore a temperature of the pipe wall 14. No artificial heating is supplied at the reference point. Preferably, the reference sensor is also a Pt100 sensor.

The reference point 25 is angularly spaced as far as possible from each of the first and second heating points 17, 21. When defined on the pipe wall 14, as is presently the case, the reference point is therefore equidistally spaced along the pipe wall 14 from both of the first and second heated spots 18, 22. Angular spacings between the reference point 25 and each of the first and second heating points 17, 21 are therefore also equal, being 120° in the illustrated embodiment. It will be appreciated that, in the illustrated embodiment, the first and second heating points 17, 21 and the reference point 25 are therefore equiangularly spaced from each other about the axis A.

The first and second heating points 17, 21 and the reference point 25 all lie in the same cross-sectional plane of the conduit. The first and second heated spots 18, 22 therefore also lie in this plane.

The system 10 also includes an electronically programmable computing device 26. The first and second temperature sensors 16A, 20A and the reference temperature sensor 24 are in communication with the computing device 26 along respective electronic communication lines 28, 30 and 32. The first and second temperature sensors 16A, 20A and the reference sensor 25 are also operatively associated with one or more electronic signal generating means (not illustrated) which are capable of electronically generating signals carrying the values of T1, T2 and T3, which are to be communicated to the computing device 26 along the communication lines 28, 30 and 32 respectively. By "operatively associated" is meant that the electronic signal generating means can receive the measured values T1, T2 and T3 in order electronically to generate the signals carrying these values.

The computing device 26 is configured and programmed operatively to receive the electronically generated signals and derive a conclusion of the condition of slurry flow conditions prevailing in the pipe 12 from a first temperature difference, which is T1 minus T2, and a second temperature difference, which is T2 minus T3. The computing device is also programmed to calculate these temperature differences from the temperature values communicated to it in the respective signals. By "operatively receive" is meant that the computing device 26 receives the signals carrying the values T1, T2 and T3, and interprets or decodes the signals in whichever manner necessary in order to calculate the above-mentioned temperature differences. With respect to the signals, it will be appreciated that embodiments can exist in which a single combined signal carrying all of the values of T1, T2 and T3 is communicated, rather than respective signals for each value.

The computing device 26 includes or is in controlling communication with visual and/or audio indicating means, or indicators, which provide visible and/or audible indications of selected conditions of slurry flow in the pipe 14, when concluded by the computing device. These are not illustrated. The indicators are configured to provide respective visible and/or audible indications on the basis of an output conclusion derived by the computing means, indicating that the output conclusion has been derived, which output conclusion is one of at least (i) that a settled particle bed has formed at the invert of the conduit, i.e. at the first heated spot; and (ii) that there is no flow in the conduit.

The computing device 26 is programmed electronically to automatically derive a conclusion that a settled particle bed has formed at the invert of the conduit on the basis of the relationship between the first temperature difference and a first reference parameter, which is a reference parameter for the first temperature difference. More particularly, the first reference parameter is a desired value of the first temperature difference and has a value of 0 (zero). A conclusion that a settled particle bed has formed at the invert of the conduit is derived by the computing device 26 on the basis that the first temperature difference is greater than 0.

The computing device 26 is programmed electronically to automatically derive a conclusion of no flow in the conduit on the basis of the relationship between the second temperature difference and a second reference parameter, which is a reference parameter for the second temperature difference or for T2. More particularly, the second reference parameter is a predetermined undesired change in the second temperature difference over a predetermined time period or a threshold value for the second temperature difference, or a threshold value for T2. Only the first option is further discussed, but it may equally be the second or third options, as described in accordance with the invention.

Specifically, the predetermined undesired change in the second temperature difference is 0.25° C. and the predetermined time period is 10 seconds. A conclusion that there is no flow in the conduit is therefore derived on the basis that the second temperature difference has increased with 0.25° C. or more within a time period of 10 seconds. The computing device 26 is therefore programmed electronically to automatically note changes in the second temperature difference, and to automatically conclude that the condition of slurry flow in the pipe 12 is that there is no flow, on the basis that a change in the second temperature difference over the predetermined time period is equal to, or exceeds the predetermined undesired change over the predetermined time period.

The computing device 26 is programmed such that a conclusion derived on the basis of the second temperature difference that there is no flow in the pipe 12 automatically overrides any other conclusion derived on the basis of the first or any other temperature differences. The conclusion that there is no flow in the pipe 12 is therefore always the output conclusion when it is derived by the computing device 26. In all other circumstances, the conclusion/s derived on the basis of the first and/or any other temperature differences that a settled bed has formed in the conduit is the output conclusion, or provides a group of output conclusions. The computing device 26 is also programmed electronically to automatically note, as a threshold value, the value of T2 minus T3 when a conclusion that there is no flow in the conduit has been derived, and such that the conclusion that there is no flow in the conduit continues to override any conclusion derived on the basis of the first or any other temperature differences until the value of T2 minus T3 is again below the threshold value of T2 minus T3.

The system 10 further includes, between the first heating point 17 and the second heating point 21, at angular spacings of less than 90° from the first heating point, third and fourth heating device/temperature sensor combinations 34/34A, 36/36A operable to generate, by delivering heat to third and fourth heating points (not illustrated) along the exterior surface of the pipe wall 14, third and fourth locally heated spots (also not indicated on the drawing) on the interior surface of the pipe wall 14. This is achieved in the same manner in which generation of the first and second heated spots 18, 22 is achieved. Heating power levels of the third and fourth heating devices 34, 36 are the same as the heating power levels of the first and second heating devices 12, 20.

The third and fourth heating device/temperature sensor combinations 34/34A, 36/36A operate in the same manner as the first and second heating device/temperature sensor combinations 16/16A, 18/18A to obtain temperature values, calculate temperature differences and derive conclusions of the conditions of slurry flow at the third and fourth heated spots. More specifically, fourth and fifth temperature values T4, T5 of the third and fourth heated spots are measured and communicated to the computing device 26. The computing device 26 then calculates third and fourth temperature differences T4 minus T2 and T5 minus T2. On the basis of the relationship between the third and fourth temperature differences and respective third and fourth reference parameters therefor, respective conclusions are derived by the computing device 26 of the condition of slurry flow prevailing at the third and fourth heated spots. The third and fourth reference parameters are desired values of the third and fourth temperature differences, each being zero. The computing device 26 is programmed to derive a conclusion that a settled particle bed has formed at the third and fourth heated spots, respectively on the basis that the third and fourth temperature differences are greater than 0. It will be appreciated that the use of such third and fourth heating device/temperature sensor combinations 34/34A, 36/36A and the information obtained therefrom, allows the computing device 26 to derive a conclusion of the profile of a settled particle bed, since the development of the settled particle bed can then be monitored as the third and fourth temperature differences are noted as becoming greater than 0. While the second temperature difference is not the output conclusion, the first, third, fourth and further temperature differences, when individually greater than zero, may therefore be a group of output conclusions. In this manner, not only is a conclusion of the formation of a bed derived, but also a conclusion of profile characteristics of the bed.

DISCUSSION

While there is unrestricted and free flow of slurry in the pipe 12, heat is removed from the first and second heated spots 18, 22 due to convective heat transfer. Since the rate of heat removal from the first and second heated spots 18, 22 will be more or less equal in such a case, the difference between the first and second temperature values (T1 minus T2, i.e. the first temperature difference) would, when the same constant level of heating power is delivered by each of the heating devices 16, 20 with the temperatures of the first and second heated spots 18, 22 also being equal, approximate zero. A zero differential between the first and second temperature values T1, T2 (i.e. a zero value of the first temperature difference) should, and does depending on the circumstances, therefore cause a conclusion of unrestricted and free flow conditions in the conduit being derived. While this holds true when a settled bed forms while there is still flow in the conduit, it does not necessarily remain true if flow conditions deteriorate and eventually result in a condition of no flow.

When flow conditions in the pipe 12 deteriorate starting from a condition of full flow, for example as a result of loss of pumping power that drives flow in the conduit and/or as a result of a change in slurry properties, thereby causing the formation of a settled particle bed at the invert of the pipe 12, flow at the invert becomes restricted. Initially, such a settled particle bed may still be in motion, being in the form of a sliding bed. Later, the bed may become completely stationary if solid particles continue to settle from suspension in the event that flow conditions do not improve.

While the bed is relatively shallow, flow above the bed may continue. In such a case the rate of heat removal from the first heated spot 18 would be perceivably less than the rate of heat removal from the second heated spot 22, due to the difference in flow conditions. Consequently, a difference between the first and second temperature values T1, T2 would be observed, with the result that the first temperature difference is no longer zero. Observing such a difference therefore requires a conclusion to be derived that a settled particle bed has formed at the invert of the pipe 12.

If flow conditions still do not improve when a bed of sediment has formed at the invert of the pipe 12, the bed may continue to grow. This would necessarily impact on flow above the bed, which would become progressively more restricted, flowing slower and slower, potentially eventually coming to a complete standstill. As flow above the bed slows, the rate of heat removal at the second heated spot 22 also slows. It will be appreciated that this will cause the second temperature value T2 progressively to increase until, when there is no flow in the pipe, it is again equal to the first temperature value T1. This increase in the second temperature value T2 necessarily affects the value of the first temperature difference (between the first and second temperature values), eventually erasing it when the first and second temperature values are again equal. In such a case, the abovementioned conclusion of free and unrestricted slurry flow when there is no difference between the first and second temperature values would not hold true and would therefore be misleading to an operator, who might assume, incorrectly, that flow has recommenced. It is in this scenario in which the second temperature difference comes into play, since slowing of the flow rate above the settled bed and consequent slowing of heat removal from the second heated spot 22 also causes the value of the second temperature difference to change. When the magnitude of this change is such that it is equal to or exceeds the second reference parameter as hereinbefore defined, an overriding conclusion of no flow is drawn despite the fact that the value of the first temperature difference is again moving toward or approximating zero.

Figure 2:
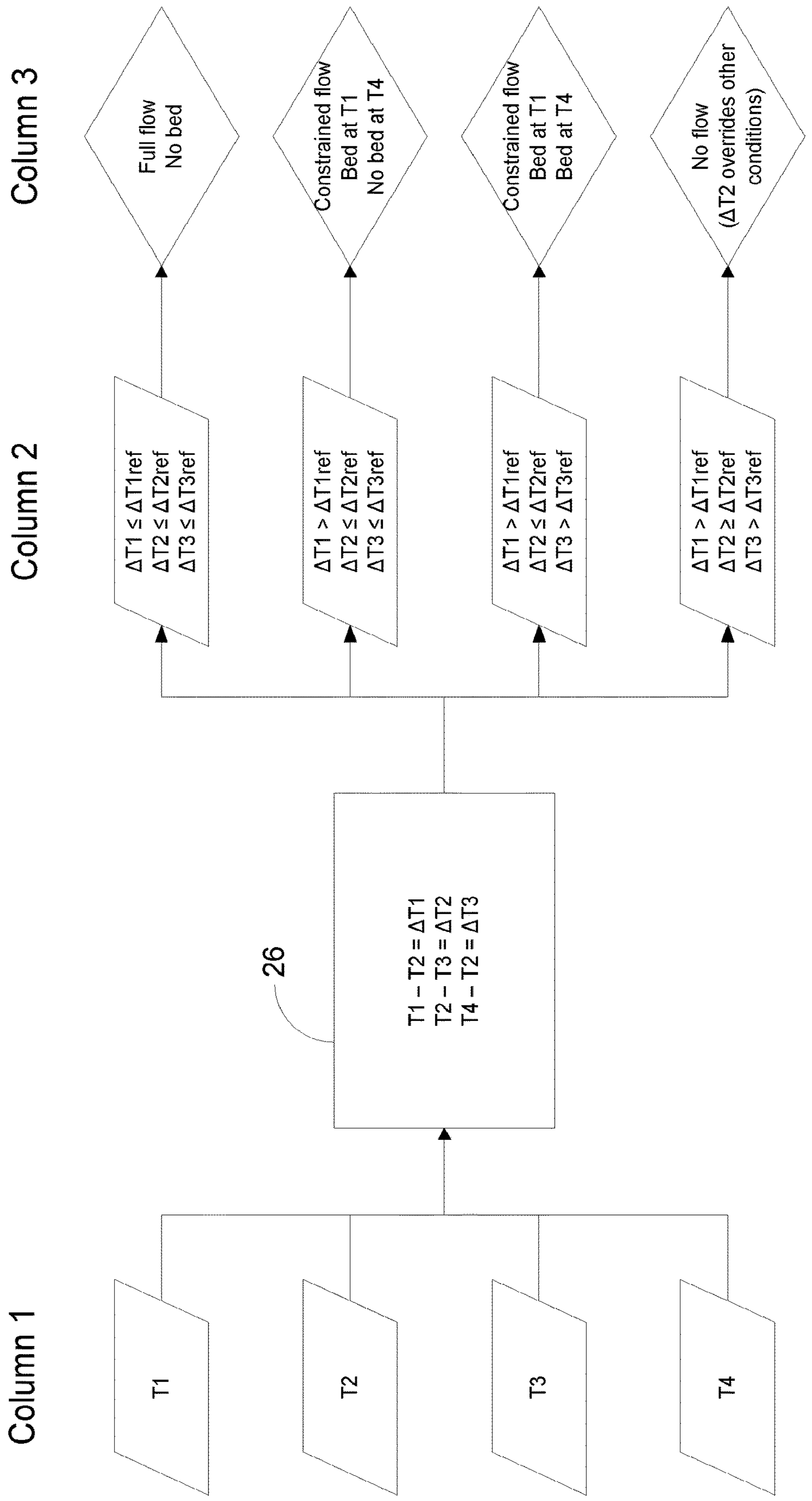
FIG. 2 shows a block diagram of operations performed according to the method of the first aspect of the invention by/under direction of the computing means/device of the system of the second aspect of the invention.

Referring to FIG. 2, the abovementioned functionality is illustrated by way of a block diagram. The values T1, T2, T3 and T4 (as represented in column 1 of FIG. 2) are communicated to the computing device 26 by means of the electronically generated signals. The computing device 26 then calculates the first, second and third temperature differences (respectively ΔT1, ΔT2, and ΔT3). For each temperature difference, a reference parameter is programmed into the computing device 26 (respectively being designated as ΔT1ref, ΔT2ref, and ΔT3ref). As will be appreciated from the foregoing discussion, ΔT1ref and ΔT3ref are discrete values of zero, while ΔT2ref is defined and set to be the actual ΔT2 value at that very point in time, when a predetermined undesired change in the value of ΔT2 over a predetermined time period occurred. ΔT2ref is therefore set only when the predetermined undesired change in the value of ΔT2 occurs. Before it occurs, ΔT2 is naturally below what ΔT2ref would be when it is set.

The computing device 26 is also programmed to determine the relationship between ΔT1, ΔT2, and ΔT3 and ΔT1ref, ΔT2ref, and ΔT3ref respectively. As is represented in column 3 of FIG. 2, the computing device 26 derives certain conclusions of the conditions of slurry flow in the pipe 12, based on the relationship of the ΔT1, ΔT2, and ΔT3 and ΔT1ref, ΔT2ref, and ΔT3ref respectively, as set out in column 2 of FIG. 2. These relationships and the conclusions that they necessitate speak for themselves from the drawing, and no further detail is provided. Based on the conclusions, each of which is an output conclusion for the relationship grouping in column 2 that requires it, visible and/or audible outputs are provided by the visual and/or audio indicating means included in the system 10. These indicating means may, in one embodiment, include green, orange and red lights. The computing device is programmed such that a conclusion of "full flow, no bed" would provide an illuminated green light, that conclusions of "constrained flow, bed at T1, no bed at T3" and "constrained flow, bed at T1, bed at T3" would provide an illuminated yellow light, and that a conclusion of "no flow" would provide an illuminated red light. The latter conclusion overrides all other conclusions. Note that in column 3 of FIG. 2, T1 and T4 are used to represent the respective heated spots for which conclusions of the condition of slurry flow are being derived by the computing means.

Against the background provided above, deriving an indication of slurry flow conditions in accordance with the method of the invention is on the basis of the first temperature difference while any changes in the second temperature difference are below the second reference parameter. When a change in the second temperature difference exceeds the predetermined reference parameter, deriving a conclusion of slurry flow conditions in accordance with the method of the invention is based on the relationship between the second temperature difference and the second reference parameter.

Results of an experimental test of the efficacy of a system as taught herein, implementing a method taught herein, except the use of T4.

Figure 3:
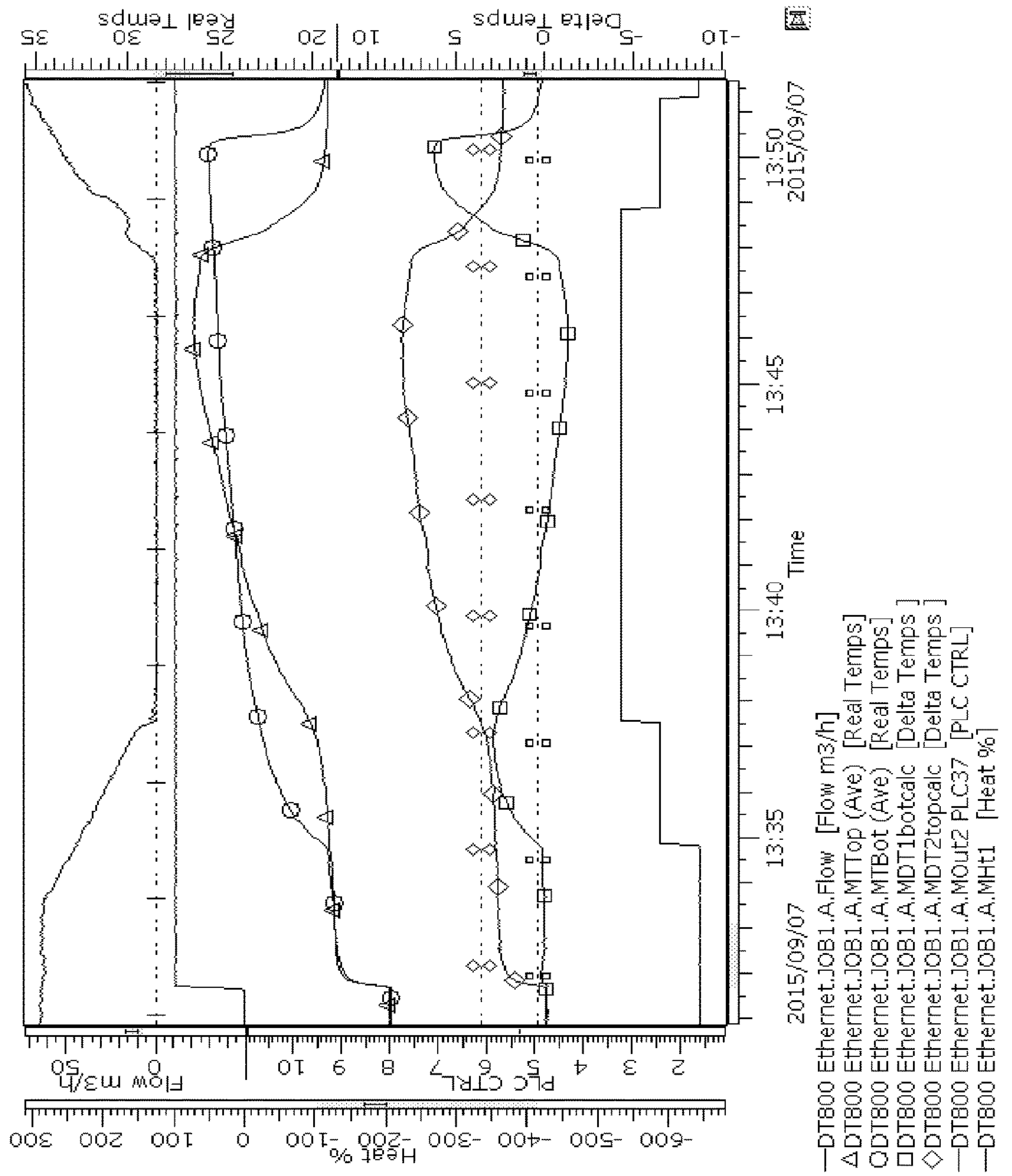
FIG. 3 shows a screenshot of electronically generated signals obtained and used in the system of the second aspect of the invention in implementing the method of the first aspect of the invention, to derive conclusions and provide visible indications of slurry flow conditions prevailing in a conduit.

Seven signals and 2 thresholds are shown in FIG. 3, which was created during a test of the overall logic of the method of the invention and its computing algorithms.

The ambient temperature and the reference temperature T3, which were measured, gradually increased during the test run. The values of these are not shown to minimize the clutter in the chart. It will be appreciated that the computing algorithms of the method of the invention use temperature differences, which in any event eliminate ambient temperature effects. Thus, T1 and T2 essentially float on the changing T3 reference temperature.

The test results show the performance of the system and the method of the invention in response to a ramping down of the flow rate to zero from a condition of full flow of slurry in the pipeline. After about 10 minutes at zero flow rate, the flow rate was again ramped up. Thus, the test represents a complete cycle from full flow to no flow and back to full flow.

An online output signal (PLC controlled) provides distinct voltage levels to communicate the computed flow conditions to either an operator by means of acoustic and/or visual alarms, or to a PLC for predefined responses in according to options available at specific operations.

Key steps shown in FIG. 3 are as follows:

1) initial auto-calibration, including switching on the heating power during full flow 2) automatically setting a threshold (first reference parameter) for (T1-T2) at 0.4 Deg C. above (T1-T2)

3) computing signals to trigger a "settled bed" indication 4) computing signals to trigger a "no flow" indication 5) computing signals to remove the "no flow" condition 6) computing signals to remove the "settled bed" condition after all settled particles have been re-suspended into full flow.

Table 1 below provides a description of the signals and the relevant axes to which they refer. The units of the thresholds are also delta temperatures in Deg C. Thus they are also shown in the Delta Temps scale.

TABLE 1

Signals and axes

| Signal | Marker | Axis Label |
|---|---|---|
| Flow rate in $m^3/h$ with dashed line for zero | none | Flow $m^3/h$ |
| Heating power | none | Heat % |
| T1 − temperature at invert | ○ | Real Temps |
| T2 − temperature at top | Δ | Real Temps |
| T2 − T3 | ◇ | Delta Temps |
| T1 − T2 | □ | Delta Temps |
| Threshold top ($TH_{top}$) | dashed line and ◇ | Delta Temps |
| Threshold invert ($TH_{inv}$) | dashed line and □ | Delta Temps |
| Computed online output in Volts for indicators | none | PLC CTRL |

Table 2 that follows explains the initiated processes and the computed conditions.

TABLE 2

Initiated processes and computed conditions

| Time | Action/process | Direct Consequence | Derived Conclusion | Output Signal (PLC Ctrl) | LED status and transition of indicators |
|---|---|---|---|---|---|
| 13:31:00 | Full flow at 65 $m^3/h$ | No settled particles at the invert of the pipe | Full flow | Baseline at 1.6 V | Green is ON |
| 13:31:35 | In response to an external calibration command: Heating power changes from zero to 100% for both sensors | Both real temperatures T1 and T2 increase | Full flow | Baseline at 1.6 V | Green is ON |
| 13:33:00 | (T1 − T2) and (T2 − T3) are stabilized | A threshold of 0.4 Deg C. above the stabilised (T1 − T2) is noted for future use. | Full flow | Baseline at 1.6 V | Green is ON |
| 13:33:30 | Ramping down of flow rate commences | | Full flow | Baseline at 1.6 V | Green is ON |
| 13:34:45 | At 46 $m^3/h$, particles settle and become stationary, thus reducing the heat removal from T1 | Sudden increase in T1 − T2. Threshold for invert is now transgressed by T1 − T2 moving upwards. | Settled bed | Increase to 2.4 V | Yellow goes ON Green goes OFF |

TABLE 2-continued

Initiated processes and computed conditions

| Time | Action/process | Direct Consequence | Derived Conclusion | Output Signal (PLC Ctrl) | LED status and transition of indicators |
|---|---|---|---|---|---|
| 13:37:10 | As flow approaches zero, T2 heats up | T1 − T2 starts to drop back towards its threshold | Settled bed | Increase to 2.4 V | |
| 13:37:30 | The 'rate of rise' of T2 − T3 exceeds a preset value (e.g. 0.25 Deg C. in 10 seconds) | At this point in time, the T2 − T3 value is noted (i.e. 3.7 Deg C.) and stored as a reference parameter ($TH_{top}$). Threshold for T2 − T3 is transgressed upwards | No flow | Increase to 3.2 V | Red goes ON Yellow goes OFF |
| 13:40:40 | T1 − T2 drops below its reference parameter ($TH_{invert}$) | No effect, as T2 − T3 is higher than $TH_{top}$. | No flow | Increase to 3.2 V | NB: When T1 − T2 is below $TH_{invert}$, this would indicate "false green", but is overridden by red LED |
| 13:46:00 | Pump starts and some minor movement of supernatant water occurs, but the flow is still too small to be recognized by the flow meter. | Minor cooling of T2 reduces T2 − T3, and thus increases T1 − T2. | No flow | Increase to 3.2 V | NB: When T1 − T2 is below $TH_{invert}$, this would indicate "false green", but is overridden by red LED |
| 13:47:50 | Meaningful flow commences and flow meter starts to provide an output. T2 is now being rapidly cooled by the flow of supernatant water. Solids are being gradually picked from the top of the settled bed. | T2 − T3 is dropping towards its threshold. The thermal inertia delays the passing of the $TH_{top}$ by about 1 minute. | No flow | Increase to 3.2 V | NB: When T1 − T2 is below $TH_{invert}$, this would indicate "false green", but is overridden by red LED |
| 13:48:50 | Further cooling down of T2. T1 − T3 is reaching a saturation level even while the bed is eroded from the top due to increasing flow rate. | T2 − T3 passes its reference parameter $TH_{top}$ of 3.7 Deg C. | Settled bed | Decrease to 2.4 V | Red goes OFF Yellow goes ON |
| 13:50:20 | Rapid decrease in T1 due to slurry flow at the invert, after all settled solids were removed. | T1 − T2 decreases rapidly. Again, some thermal inertia delays the transgressing of the $TH_{inv}$ downwards by one minute. | | | |
| 13:51:15 | Further cooling of T1 after solids are all re-suspended into the slurry | T1 − T2 passes $TH_{inv}$ downwards. | Full flow | Decrease to 1.6 V | Yellow goes OFF Green goes ON |

The applicant believes that the invention as described provides an elegant and effective approach to monitoring and determining the undesired occurrence as well as the vertical extent of sedimentation at the pipe invert in a pipeline. The invention is in this regard not limited to pipelines, but could also find application in open conduits which are not visually monitored.

Exemplary embodiment of a system taught herein, implementing a method taught herein.

Referring again to FIG. 1, in an alternative embodiment of the system 10, the first and second heating devices 16, 20 are variable power heating devices, each delivering heat to the pipe wall 14 respectively at the first and second heating points 17, 21 respectively at a first heating power level W1 and at a second heating power level W2, each of which is maintained substantially constant over time, except when adjusted as described below.

In the alternative embodiment of the system 10, the sensors 16A, 20A may be incorporated in their associated heating devices 16, 20, e.g. being in the form of heated sensor heads.

Further, in the alternative embodiment of the system 10, the electronic programming and configuration of the computing device 26 is different to that hereinbefore described. More specifically, the computing device 26 is electronically programmed and configured to

- automatically
  - calculate a first temperature difference dT1 between T1 and T3 and compare dT1 to a reference value for dT1, dT1ref, or
  - compare T1 to a desired value for T1, T3", that is T3 plus a predetermined value T3',
- automatically cause the first heating device to change the heating power level W1 delivered to the conduit wall at the first heating point if
  - dT1 is not equal to dT1ref, optionally not within an allowable deviation of dT1ref, sufficiently to change T1 such that dT1 is equal to dT1ref, optionally within an allowable deviation of dT1ref, or
  - T1 is not equal to T3", optionally within an allowable deviation of T3", sufficiently to change T1 such that T1 is equal to T3", optionally within an allowable deviation of T3"
- automatically
  - calculate a second temperature difference dT2 between T2 and T3 and compare dT2 to a reference value for dT2, dT2ref, or
  - compare T2 to a desired value for T2, T3"", that is T3 plus a predetermined value T3'";
- automatically cause the second heating device to change the heating power level W2 delivered to the conduit wall at the second heating point if
  - dT2 is not equal to dT2ref, optionally not within an allowable deviation of dT2ref, sufficiently to change T2 such that dT2 is equal to dT2ref, optionally within an allowable deviation of dT2ref, or;
  - T2 is not equal to T3"", optionally within an allowable deviation of T3"", sufficiently to change T1 such that T1 is equal to T3"", optionally within an allowable deviation of T3"";
- automatically calculate a power difference dW between W1 and W2 and compare dW to a reference value for dW, dWref;
- automatically compare W2 to a reference value for W2, W2ref, and
- automatically derive a conclusion of a condition of slurry flow prevailing in the conduit based at least on a relationship between dW and dWref and between W2 and W2ref.

In deriving a conclusion of the condition of slurry flow prevailing in the conduit,

- if an absolute value of dW is smaller than an absolute value of dWref and an absolute value of W2 is greater than an absolute value of W2ref, the computing device concludes that there is unrestricted flow in the conduit, in that no flow restricting bed of solid material has formed at the invert of the conduit,
- if an absolute value of dW is greater than an absolute value of dWref and an absolute value of W2 is greater than an absolute value of W2ref, the computing device concludes that here is partially restricted flow in the conduit, in that a flow restricting bed of solid material has formed at the invert of the conduit, and
- if an absolute value of W2 is smaller than an absolute value of W2ref, the computing device concludes that there is restricted flow in the conduit, in that flow in the conduit has virtually ceased.

Thus, the computing device 26 is in controlling communication with the first and second heating devices 16, 20 respectively, to control the first and second heating devices 16, 20 respectively by selectively causing the first and second heating devices 16, 20 respectively to change the first and second heating power levels W1, W2 respectively, in the circumstances discussed above.

Example 1 of a System of the Sixth Aspect of the Invention in Operation

The following parameters are provided:

W1 (supplied by first heating device 16)

T1 (supplied by W1 and measured by temperature sensor 16A)

W2 (supplied by second heating device 20)

T2 (supplied by W2 and measured by temperature sensor 20A)

W2ref (predetermined constant reference value for W2)

dW=W2−W1 dWref (predetermined constant reference value for dW)

T3=measured by temperature sensor 24

(T3 is a floating reference value for T1 and T2 respectively)

dT1=T1-T3 dT2=T2-T3

For the example

W2ref=8

W1 at unrestricted flow is 10

W2 at unrestricted flow is 10 dWref=2

T3=24

T1 and T2=32 at full flow

It is desired for dT1 and dT2, respectively, to approximate a desired constant, which is 8° C. in the example, alternatively meaning that predetermined values T3' and T3'" are equal to 8, with T3" and T3"" respectively being T3+8.

At full flow dW=W2−W1=10−10=0<2 (dWref)

W2=10>8 (W2ref)

dT1=8° C.

dT2=8° C.

Thus, dW<dWref and W2>W2ref which are the conditions for a conclusion of full flow A bed forms at the invert, with flow above the bed T1 increases dT1 increases Controller for W1 responds decreases power to W1 to 4 dT1 restored dW=W2−W1=10−4=6>2 (dWref)

W2=10>8 (W2ref)

Thus, dW>dWref and W2>W2ref which are the conditions for a conclusion of bed formation, i.e. partially restricted flow.

Flow deteriorates and ultimately gets fully restricted

T1 increases

T2 increases dT1 increases dT2 increases

Controllers for W1 and W2 respond
further decreases power to W1 to 2
decreases power to W2 to 5<8 (W2ref)
dT1 restored
dT2 restored
dW=W2-W1=5−2=3>2 (dWref)
Thus, dW>dWref, but since W2<W2ref, a conclusion of no flow is drawn (it may be that under no flow dW<dWref, but the overriding factor (rule) is W2<W2ref)

Example 2 of a System of the Sixth Aspect of the Invention in Operation

Figure 4:
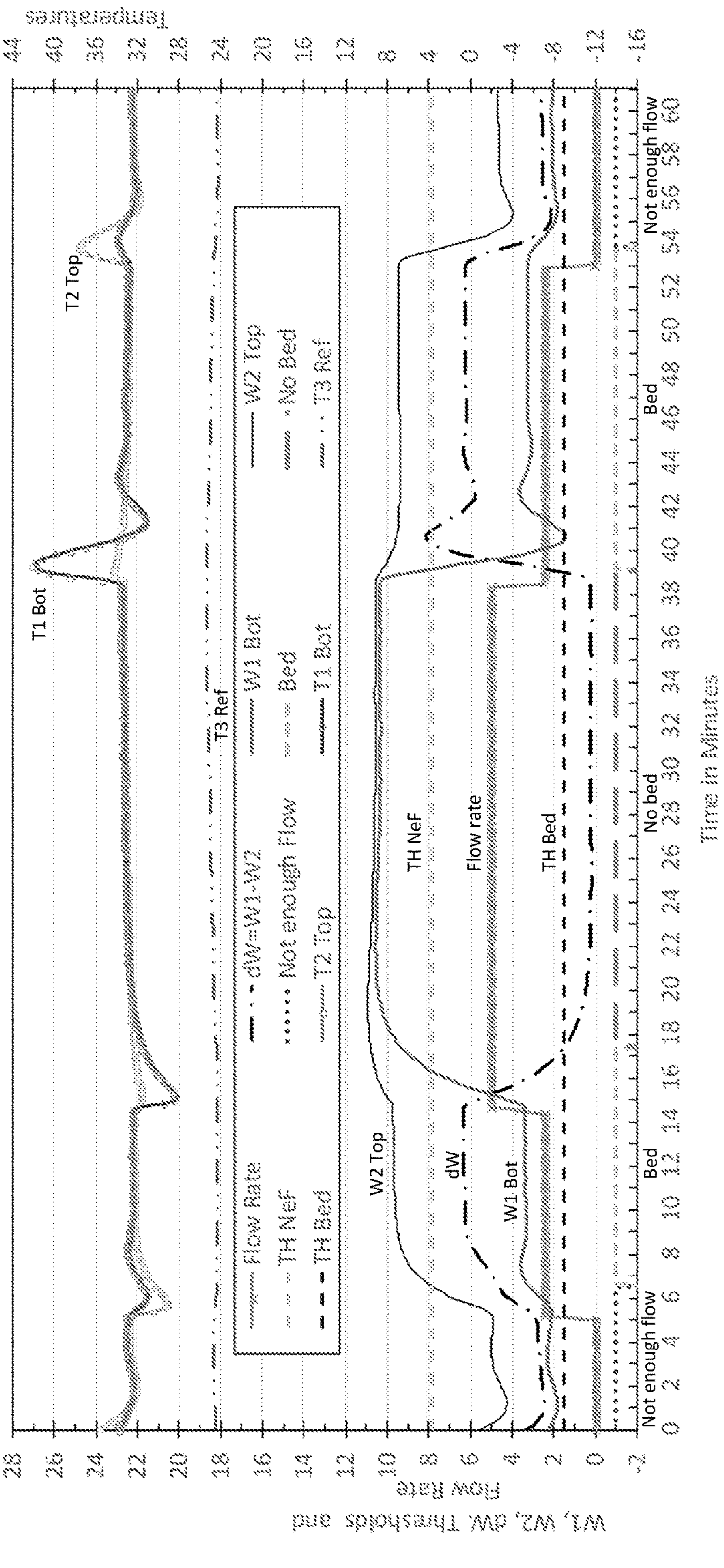
FIG. 4 shows a plot of temperatures, temperature differentials, and power levels of the system of the sixth aspect of the invention when performing the method of the fifth aspect of the invention.

Referring now to FIG. 4, which illustrates a chart of the performance of the system of the sixth aspect of the invention using individual PID-controllers for two heated sensor heads 16, 20. The following parameters, separated into four separate groups, are shown in the chart:

Changing the Process Condition:

Flow Rate, which was set to zero flow (restricted flow) at the start, then to a flow rate with a bed (partially restricted flow), and then to a high flow rate with no bed (unrestricted flow). Thus, the three flow rates create the three distinct process conditions to be identified by the instrumentation.

Sensing the Temperature Responses to Variable Flow and/or Bed Conditions:

T1Bot is T1, provided and measured by the heated bottom heating device/sensor 16, 16A at pipe invert, automatically controlled to be about 8° C. above the reference temperature.

T2Top is T2, provided ad measured by the heated top heating device/sensor 20, 20A, automatically controlled to be also about 8° C. above the reference temperature.

T3Ref is T3, measured by the unheated reference sensor 24 to provide a set point, based on slurry temperature.

Controlling to Maintain the Set Points:

W1Bot is W1, the variable heat supplied to the bottom sensor 16A to maintain the desired set point under all process conditions. For this test, the set point for both heating devices 16, 20, as mentioned above, is 8° C. above T3 (i.e. the desired values for dT1 and dT2 are 8, alternatively that T3' and T3'" are each 8, and T3" and T3" " are each T3+8). It varies naturally, as the slurry temperature changes, e.g. from the energy supplied by the centrifugal pump in the recirculating pipe loop.

W2Top is W2, the variable heat supplied to the top sensor 20A to maintain the desired set point under all process conditions.

Computing to Derive at a Conclusion and its Visualisation:

dW is the difference between the heat supplied to the two sensors.

TH NeF is W2ref, the threshold for 'Not enough Flow', which is set to trigger the condition of 'no flow' (restricted flow), as well as the condition of re-commencing the flow, by using W2 Top.

TH Bed is dWref, the threshold for a settled bed (partially restricted flow) at the bottom of the pipeline, and in turn for bed erosion.

Visualisation of computed conditions: This has been done in practice with a set of 3 different LEDs (red, yellow and green). The ON condition of the relevant LED is shown at the bottom of the chart. E.g. the solid red line represents the period of 'Not enough Flow', i.e 'No Flow'. The yellow line represents the settled 'Bed' condition (with flow). The green line represents flow with 'No Bed'. The LEDs are triggered by the various algorithms/rules, as well as applicable over-riding rules, as mentioned in the original specifications.

TABLE 3

Example 2 of the system of the sixth aspect of the invention, with reference to FIG. 4

| Time | Sensing/Condition | Responses/Explanations | Comments/Flow Rate Changes |
|---|---|---|---|
| 4 | Stable temperatures and stable, but unequal heat is supplied to both sensors. | The settled bed 'acts' like an insulator and thus less heat is needed to maintain the set point for the bottom sensor, when compared to the top sensor. Top sensor 'sees' clear water, which takes more heat away than the settled bed, even during no flow conditions. | Pipe loop has been standing for a while with a settled bed. |
| 5 | T2Top drops more than T1Bot due to cold water flowing past the sensor, thereby cooling the hot spot. | Controller detects the drop of T2Top and thus increases gradually the heat to the top sensor. | Only a low flow rate is initiated to avoid erosion of the bed. |
| 6<br>7<br>8 | W2Top increases and passes upwards through the threshold for 'Not enough Flow', TH NeF. | The red LED for 'Not enough Flow' turns OFF, and the yellow LED goes ON to indicate a bed condition, with some flow above. | This output is the key insight which the patented technology provides to the operator/pump control. |
| 14<br>15<br>16 | The temperature T1Bot drops rapidly due to the erosion of the insulating bed, while the heat supply is still low. | The controller detects the temperature drop and reacts by increasing the heat W1Bot. Thus T1Bot increases until it reaches the set point again, being 8° C. above the slurry temperature, T3Ref. | Flow rate is increased to significantly above the deposition velocity, thus the bed is completely eroded. |

TABLE 3-continued

Example 2 of the system of the sixth aspect of the invention, with reference to FIG. 4

| Time | Sensing/Condition | Responses/Explanations | Comments/Flow Rate Changes |
|---|---|---|---|
| 17 | dW drops below threshold for No Bed. | System calculates that both criteria are met to qualify for a green LED for flow with no bed: W2 > TH NeF, as well as dW < TH Bed. | The system response could be improved to be faster than 3 Minutes, but that could result in an undesired under-swing of dW when a bed develops, i.e. at 55 Minutes in upper chart. |
| 22-37 | Stable and equal heat supply to both sensors, as both sensors are cooled by the moving slurry. | dW is zero and clearly below the threshold for no bed. | This is regarded as the normal operation without a bed. |
| 38 | T1Bot increases rapidly due to high heat supply to the bottom sensor before flow reduction. I.e. heat is stored in the sensor. | The sudden bed reduces the heat removal from the bottom of the pipe. The controller reacts to the rapid temperature increase and reduces the heat supply accordingly. | Flow rate is reduced to create a sudden stationary bed. |
| 39 | dW increases and passes upwards through the threshold. | The green LED changes to the yellow LED indicating a bed, while the slurry is still flowing. | The bed detection happens within 1 Minute, which is much faster than the detection of bed erosion, which was about 3 Minutes |
| 53 | T2 increases rapidly due to stored heat in the sensing head. | W2 is reduced automatically by the controller. | Flow rate is stopped to zero. |
| 54 | W2Top passes downwards through the threshold for 'Not enough Flow'. | The yellow LED changes to the red LED for No Flow conclusion. | T1Bot only reacts mildly to the flow stoppage, as the sensor is already covered with a settled bed. |
| 55 | The under-swing of dW does not pass downward through the threshold for no bed. | Control parameters and thresholds are suitably set for this test configuration. | The correct setting of the two thresholds is important to ensure that during flow reduction, TH NeF is passed by W2, i.e at 54 minutes in above test, before dW would potentially passing through TH Bed, i.e. at 55 minutes in above test. |

I claim:

1. A method of electronically deriving a conclusion of a condition of slurry flow in a non-vertical conduit having a conduit wall and which contains a slurry to flow or flowing along the conduit, the method comprising:

artificially generating at a first heating point on the conduit wall, which is defined at the invert of the conduit, a first locally heated spot on an interior surface of the conduit wall, using heat delivered to the conduit wall by a first heating device at a first variable heating power level W1 that is substantially constant over time;

artificially generating at a second heating point on the conduit wall, which is defined angularly spaced from the first heating point at an angular spacing of at least 90° and which is not spaced from the first heating point along the length of the conduit but which lies in the same cross-sectional plane of the conduit as the first heating point, a second locally heated spot on the interior surface of the conduit wall using heat delivered to the conduit wall by a second heating device at a second variable heating power level W2 that is substantially constant over time;

locally measuring the temperatures of the first and second locally heated spots respectively, thereby obtaining a first temperature value T1 and a second temperature value T2;

measuring, at a predetermined reference point spaced from the first and second heating points, a third reference temperature value T3;

communicating electronically generated signals carrying the values W1, W2, T1, T2, and T3 to one or more electronic computing devices, which operatively receives the signals and electronically:

automatically calculates a first temperature difference dT1 between T1 and T3 and compares dT1 to a reference value for dT1, being dT1ref, automatically causes the first heating device to change the heating power level W1 delivered to the conduit wall at the first heating point if dT1 is not equal to dT1ref, or not within an allowable deviation of dT1ref, sufficiently to change T1 such that dT1 is equal to dT1ref, or within an allowable deviation of dT1ref, automatically calculates a second temperature difference dT2 between T2 and T3 and compares dT2 to a reference value for dT2, being dT2ref, automatically causes the second heating device to change the heating power level W2 delivered to the conduit wall at the second heating point if dT2 is not equal to dT2ref, or not within an allowable deviation of dT2ref, sufficiently to change T2 such that dT2 is equal to dT2ref, or within an allowable deviation of dT2ref;

automatically calculates a power difference dW between W1 and W2 and compares dW to a reference value for dW, being dWref, automatically compares W2 to a reference value for W2, being W2ref, and automatically derives a conclusion of a condition of slurry flow prevailing in the conduit based at least on a relationship between dW and dWref and between W2 and W2ref, that if an absolute value of dW is smaller than an absolute value of dWref and an absolute value of W2 is greater than an absolute value of W2ref, there is unrestricted flow in the conduit, in that no flow restricting bed of solid material has formed at the invert of the conduit, if an absolute value of dW is greater than an absolute value of dWref and an absolute value of W2 is greater than an absolute value of W2ref, there is partially restricted flow in the conduit, in that a flow restricting bed of solid material has formed at the invert of the conduit, and if an absolute value of W2 is smaller than an absolute value of W2ref, there is restricted flow in the conduit, in that flow in the conduit has ceased.

2. The method according to claim 1, wherein

W2ref>0

W2ref>dWref>0

W2>W2ref at unrestricted flow

W1=W2 at unrestricted flow.

3. A slurry flow condition monitoring system for electronically deriving a conclusion of a condition of slurry flow in a non-vertical conduit having a conduit wall and which contains a slurry to flow or flowing along the conduit, the system including:

a first heating device that is arranged and configured to deliver heat to the conduit wall at a first heating point on the conduit wall, which is defined at the invert of the conduit, thereby to artificially generate a first locally heated spot on an interior surface of the conduit wall by delivering heat to the conduit wall at a first variable heating power level W1 that is substantially constant over time, and a second heating device that is arranged and configured to deliver heat to the conduit wall at a second heating point on the conduit wall, which is defined angularly spaced from the first heating point at an angular spacing of at least 90° and which is not spaced from the first heating point along the length of the conduit but which lies in the same cross-sectional plane of the conduit as the first heating point, to thereby artificially generate a second locally heated spot on an interior surface of the conduit wall by delivering heat to the conduit wall at a second variable heating power level W2 that is substantially constant over time;

first and second temperature sensors that are arranged locally and configured to measure the temperatures of the first and second heated spots respectively, thereby to obtain a first temperature value T1 and a second temperature value T2;

a third temperature sensor that is arranged and configured to measure a third reference temperature at a reference point spaced away from the first and second heating points, thereby to obtain a third reference temperature value T3;

electronic signal generating means capable of electronically generating signals carrying the values W1, W2, T1, T2 and T3; and one or more computing devices in communication with the electronic signal generating means operatively configured to receive the signals carrying the values W1, W2, T1, T2 and T3, the one or more computing devices being programmed electronically and configured to:

automatically calculate a first temperature difference dT1 between T1 and T3 and compare dT1 to a reference value for dT1, being dT1ref, automatically cause the first heating device to change the heating power level W1 delivered to the conduit wall at the first heating point if dT1 is not equal to dT1ref, or not within an allowable deviation of dT1ref, sufficiently to change T1 such that dT1 is equal to dT1ref, or within an allowable deviation of dT1ref, automatically calculate a second temperature difference dT2 between T2 and T3 and compare dT2 to a reference value for dT2, being dT2ref, automatically cause the second heating device to change the heating power level W2 delivered to the conduit wall at the second heating point if dT2 is not equal to dT2ref, or not within an allowable deviation of dT2ref, sufficiently to change T2 such that dT2 is equal to dT2ref, or within an allowable deviation of dT2ref, automatically calculate a power difference dW between W1 and W2 and compare dW to a reference value for dW, being dWref, automatically compare W2 to a reference value for W2, being W2ref, and automatically derive a conclusion of a condition of slurry flow prevailing in the conduit based at least on a relationship between dW and dWref and between W2 and W2ref, that if an absolute value of dW is smaller than an absolute value of dWref and an absolute value of W2 is greater than an absolute value of W2ref, there is unrestricted flow in the conduit, in that no flow restricting bed of solid material has formed at the invert of the conduit, if an absolute value of dW is greater than an absolute value of dWref and an absolute value of W2 is greater than an absolute value of W2ref, there is partially restricted flow in the conduit, in that a flow restricting bed of solid material has formed at the invert of the conduit, and if an absolute value of W2 is smaller than an absolute value of W2ref, there is restricted flow in the conduit, in that flow in the conduit has ceased.

4. The system according to claim 3, wherein

W2ref>0

W2ref>dWref>0

W2>W2ref at unrestricted flow

W1=W2 at unrestricted flow.

* * * * *